United States Patent
Schlitzkus et al.

(10) Patent No.: US 11,485,343 B2
(45) Date of Patent: Nov. 1, 2022

(54) SENSOR ARRANGEMENT FOR A BRAKING SYSTEM OF A VEHICLE AND CORRESPONDING BRAKING SYSTEM

(71) Applicant: Robert Bosch GmbH, Stuttgart (DE)

(72) Inventors: Michael Schlitzkus, Dietmannsried (DE); Helmut Seiband, Bobingen (DE); Reinhold Wolpert, Neuenstadt (DE); Sandra Heim, Bad Hindelang (DE); Stefan Lehenberger, Weitnau (DE); Valentin Notemann, Sonthofen (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 16/738,214

(22) Filed: Jan. 9, 2020

(65) Prior Publication Data

US 2020/0262411 A1    Aug. 20, 2020

(30) Foreign Application Priority Data

Feb. 14, 2019  (DE) ...................... 10 2019 202 011.9

(51) Int. Cl.
| | | |
|---|---|---|
| *G01L 19/14* | (2006.01) | |
| *B60T 17/22* | (2006.01) | |
| *F16D 66/00* | (2006.01) | |
| *G01D 11/24* | (2006.01) | |
| *B60T 13/66* | (2006.01) | |

(52) U.S. Cl.
CPC ............ *B60T 17/221* (2013.01); *B60T 13/66* (2013.01); *F16D 66/00* (2013.01); *G01D 11/245* (2013.01); *F16D 2066/006* (2013.01)

(58) Field of Classification Search
CPC ...... B60T 13/66; B60T 13/146; B60T 13/662; B60T 13/686; G01D 11/30; G01L 19/14
USPC ......... 303/3, 7, 15, 20, 122.03–122.15, 191, 303/192; 701/70, 72
See application file for complete search history.

(56) References Cited

U.S. PATENT DOCUMENTS

| | | | |
|---|---|---|---|
| 8,764,127 B2 * | 7/2014 | Leibfried | B60T 8/4872 303/191 |
| 9,802,596 B2 * | 10/2017 | Binder | B60T 13/146 |

(Continued)

FOREIGN PATENT DOCUMENTS

| | | | |
|---|---|---|---|
| DE | 102012204905 A1 * | 10/2013 | ......... G01L 19/0038 |
| DE | 10 2014 221 368 A1 | 8/2015 | |

*Primary Examiner* — Christopher P Schwartz
(74) *Attorney, Agent, or Firm* — Maginot, Moore & Beck LLP

(57) ABSTRACT

A sensor arrangement for a braking system of a vehicle is disclosed comprising a connection interface, a control unit, and a sensor. The sensor has an external interface with electrical contacts via which the sensor is connected to the control unit. The control unit is connected to and supplied with power via the connection interface and exchanges data with a higher-level unit via the connection interface. The sensor is provided power via the electrical contact points and provides electrical output signals via the electrical contact points. A first contact point provides a first electrical output signal and is connected to the connection interface via a first switching element such that the first contact point is connected to the connection interface when the first switching element is in the deenergized state and is disconnected from the connection interface when the first switching element is in the energized state.

9 Claims, 2 Drawing Sheets

(56) References Cited

U.S. PATENT DOCUMENTS

| | | | |
|---|---|---|---|
| 10,053,074 B2* | 8/2018 | Kindberg | B60T 8/1701 |
| 2021/0278485 A1* | 9/2021 | Friedrich | G01D 5/14 |

* cited by examiner

SENSOR ARRANGEMENT FOR A BRAKING SYSTEM OF A VEHICLE AND CORRESPONDING BRAKING SYSTEM

This application claims priority under 35 U.S.C. § 119 to application no. DE 10 2019 202 011.9, filed on Feb. 14, 2019 in Germany, the disclosure of which is incorporated herein by reference in its entirety.

TECHNICAL FIELD

The disclosure concerns a sensor arrangement for a braking system of a vehicle. The object of the present disclosure is also a corresponding braking system for a vehicle with such a sensor arrangement.

BACKGROUND

From the prior art, braking systems for vehicles are known in which at least one sensor is used for determining pressure, for example during an individual brake pressure modulation in individual wheel brakes of the vehicle braking system. During such an individual brake pressure modulation, various control functions may be carried out for longitudinal and transverse stabilization of the vehicle, such as for example locking protection control ABS, drive slip control ASR, driving dynamics control ESP (ESP: Electronic Stability Program) etc. Vehicles with such driving dynamics control include a specially adapted braking system for carrying out automatic wheel-specific radial braking interventions on the individual wheels. Such braking systems usually include a hydraulic unit with multiple solenoid valves, a hydraulic unit, a control unit and at least one sensor that detects at least one physical variable in the hydraulic unit. The solenoid valves of the hydraulic unit are controlled by the control unit in order to switch between a manual braking mode (foot brake mode) and an automatic braking mode and to modulate the brake pressure on the individual wheel brakes.

The detected physical variables of the at least one sensor, such as for example pressure, temperature, etc., or the detected sensor data may be requested by the control unit and provided to a higher-level unit for further processing in the vehicle. Especially in the case of vehicles with (partially) autonomous driving functions, the requested sensor data can be used to detect a brake pedal actuation or an automatic braking process, etc. to warn a vehicle behind. In order to output the sensor data, the control unit or the braking system must be active and operating without faults. If the braking system is inactive, the braking system must be started, and the sensor data can only be requested after the starting routine of the braking system has completed. Since the entire braking system has to be started up first, a relatively large amount of power is required. Thus, with the known braking systems it is not possible to request the sensor data if the braking system is switched off or if the braking system fails.

From DE 10 2014 221 368 A1 a connection device for a sensor and an associated sensor are known. The sensor includes a protective sleeve in which are arranged at least one measuring element, which is implemented for example as a pressure measuring cell, a circuit carrier and a connection device with a circuit board arranged perpendicular to the circuit carrier and a supporting unit. The circuit board carries an electronic circuit with at least one electronic and/or electrical component. The circuit carrier has an internal interface, which picks up at least one electrical output signal of the measuring element and applies it to the electronic circuit. The supporting unit forms an external interface with at least one electrical contact point, via which at least one output signal of the electronic circuit is accessible. As a result, the sensor or the electronic circuit of the sensor may be connected to an external circuit or a control unit.

SUMMARY

The sensor arrangement for a braking system of a vehicle according to the disclosure and the corresponding braking system for a vehicle have the advantage that output signals or sensor data of at least one sensor can be requested without activation or start-up of the control unit and can thus be made available to a higher-level unit for further processing in the vehicle. Thus, the output signals or sensor data can be requested and processed further even in the event of a failure of the control unit. Thus, the sensor arrangement according to the disclosure is suitable for use in vehicles with (partially) autonomous driving functions, which in event of failure of the control unit can use the output signals or sensor data in an emergency program to slow the vehicle down to a standstill. Furthermore, in the case of a parked vehicle, it can be advantageously checked whether the driver is operating the brake pedal with sufficient force in order to ensure that the vehicle can be started safely. This is particularly of interest for vehicles that have a keyless starting system. In the case of embodiments of the sensor system according to the disclosure, advantageously with such vehicles the entire braking system does not have to be started up in order to obtain this information.

Embodiments of the present disclosure provide a sensor arrangement for a braking system of a vehicle that comprises a connection interface of the braking system, a control unit and at least one sensor, which comprises an external interface with electrical contact points via which the at least one sensor is connected to the control unit. In addition, the control unit is connected to the connection interface and can be supplied with power via the connection interface. Furthermore, the control unit exchanges data with a higher-level unit via the connection interface. At least one electrical output signal of an electronic circuit of at least one sensor can be picked up and the at least one sensor can be supplied with power via the electrical contact points. Here, a first contact point provides a first electrical output signal of the electric circuit and can be connected to the connection interface via a first switching element. The first contact point is connected to the connection interface when the first switching element is in the deenergized state and is disconnected from the connection interface when the first switching element is in the energized state.

In addition, a braking system for a vehicle is proposed with a connection interface, a hydraulic unit, a control unit, at least one sensor detecting at least one physical variable in the hydraulic unit and a sensor arrangement of such a type.

Since the first contact point of the at least one sensor is connected to the connection interface of the braking system when the first switching element is in the deenergized state, the at least one sensor can thus provide the desired data to the vehicle at any time (if necessary, redundantly by using multiple sensors) without having to use the control unit. As a result, no power consumption of the control unit or no "start-up" of the braking system or control unit is required in order to be able to request the data.

The control unit can be understood in the present case to be an electrical device that processes or evaluates detected sensor signals. To this end, the control unit may comprise at least one computing unit for processing signals or data, at least one memory unit for storing signals or data, at least one interface to a sensor or an actuator for reading sensor signals from the sensor or for issuing control signals to the actuator and/or at least one communication interface for reading in or for outputting data embedded in a communication protocol. The at least one interface may be implemented in hardware and/or software. In a hardware embodiment, the interfaces can be, for example, part of a so-called system ASIC that contains various functions of the control device. However, it is also possible that the interfaces may be separate integrated circuits or may at least partly consist of discrete components. In a software embodiment, the interfaces may be software modules that are provided in a microcontroller alongside other software modules, for example. For example, the computing unit may be a signal processor, a microcontroller or similar, wherein the memory unit may be a flash memory, an EEPROM or a magnetic memory unit. The communication interface may be designed to read in or to output data wirelessly and/or by wire, wherein a communication interface that can read in or output data by wire, for example, may read the data in electrically or optically from a suitable transmission line, or may output the data electrically or optically to a suitable data transmission line. Also of advantage is a computer program product with program code that is stored on a machine-readable medium such as a semiconductor memory, a disk memory or an optical memory and that is used to perform the evaluation when the program is executed by the evaluation and control unit.

The measures and developments mentioned in the embodiments have enabled advantageous improvements to the measures and developments of the sensor arrangement for a braking system of a vehicle.

It is particularly advantageous that the first contact point can be connected to a computing unit of the control unit when the first switching element is in the energized state. Thus, by energizing or controlling the first switching element, which can be carried out by the control unit for example, the first contact point of at least one sensor can be connected to the computing unit of the control unit, which then receives, evaluates and further processes the first output signal. The first output signal may then be requested from the control unit by the higher-level unit via the connection interface or may be transmitted by the control unit to the higher-level unit via the connection interface. This allows the first contact point to be connected in such a way that in defined cases (e.g. if the brake system is inactive or in the event of a fault) the first output signal can be "redirected" to the connection interface of the brake system.

In an advantageous embodiment of the sensor arrangement, a second contact point may provide a second electrical output signal of the electronic circuit of the sensor and may be directly connected to a computing unit of the control unit. As a result, it is possible that both the higher-level unit via the first contact point and the computing unit or the control unit via the second contact point can receive output signals of the at least one sensor independently of each other. Here, the first output signal and the second output signal of the sensor may be identical. Alternatively, the two output signals of the sensor can be different from each other.

In a further advantageous design of the sensor arrangement, at least an electrical output signal may correspond to an analog measurement variable or to digital measurement data that the electronic circuit determines from analog measurement variables. In addition or alternatively, at least one electrical output signal may correspond to digital state data that the electronic circuit generates from an analog measurement variable or from digital measurement data. By providing digital output signals of at least one sensor via the connection interface, the driving safety of the vehicle can be increased, as this digital data can be used by various other control units in the vehicle to perform (partially) autonomous driving functions. In addition to the directly available measurement variables, such as brake pressure, temperature, etc., the electronic circuit of the sensor can also generate additional information from the measurement variables and can make it available at the contact points of the external interface of the sensor and thus at the connection interface of the braking system. The additional information may be state data, for example, which can indicate, for example, whether a brake pedal is being operated or not, whether the brake pressure is higher or lower than the predetermined value, and so on. This makes it easy, for example, to implement the function of a brake light switch, which in conventional braking systems can be implemented by installing an additional mechanical switch on the brake pedal at additional cost and an associated high failure rate. In addition, additional logic is necessary for conventional braking systems to indicate autonomous or automatic braking processes of the braking system by means of the brake light without brake pedal operation.

In a further advantageous embodiment of the sensor arrangement, a third contact point can be connected via a second switching element to a first power supply of the control unit or via the connection interface to a second power supply. In addition, a fourth contact point may be connected to a ground connection of the control unit. Thus for example, when the second switching element is in the deenergized state the third contact point may be connected via the connection interface to the second power supply and may be connected to the first power supply when the second switching element is in the energized state. As a result, it is possible to supply the at least one sensor from a power source that is independent of the control unit or independent of the power supply of the control unit. Since the control unit does not need to be active to supply the sensor, the corresponding current for supplying the sensor is very small or significantly smaller than the current for supplying the control unit.

In a further advantageous embodiment of the sensor arrangement, the first switching element the second switching element can be arranged within the control unit. Due to this arrangement of the switching elements, no additional space and no additional cabling effort are required. Of course, the switching elements can also be arranged outside the control unit.

Exemplary embodiments of the disclosure are shown in the drawing and are explained in more detail in the following description. In the drawing, the same reference characters denote components or elements that perform the same or similar functions.

DETAILED DESCRIPTION

Figure 1:
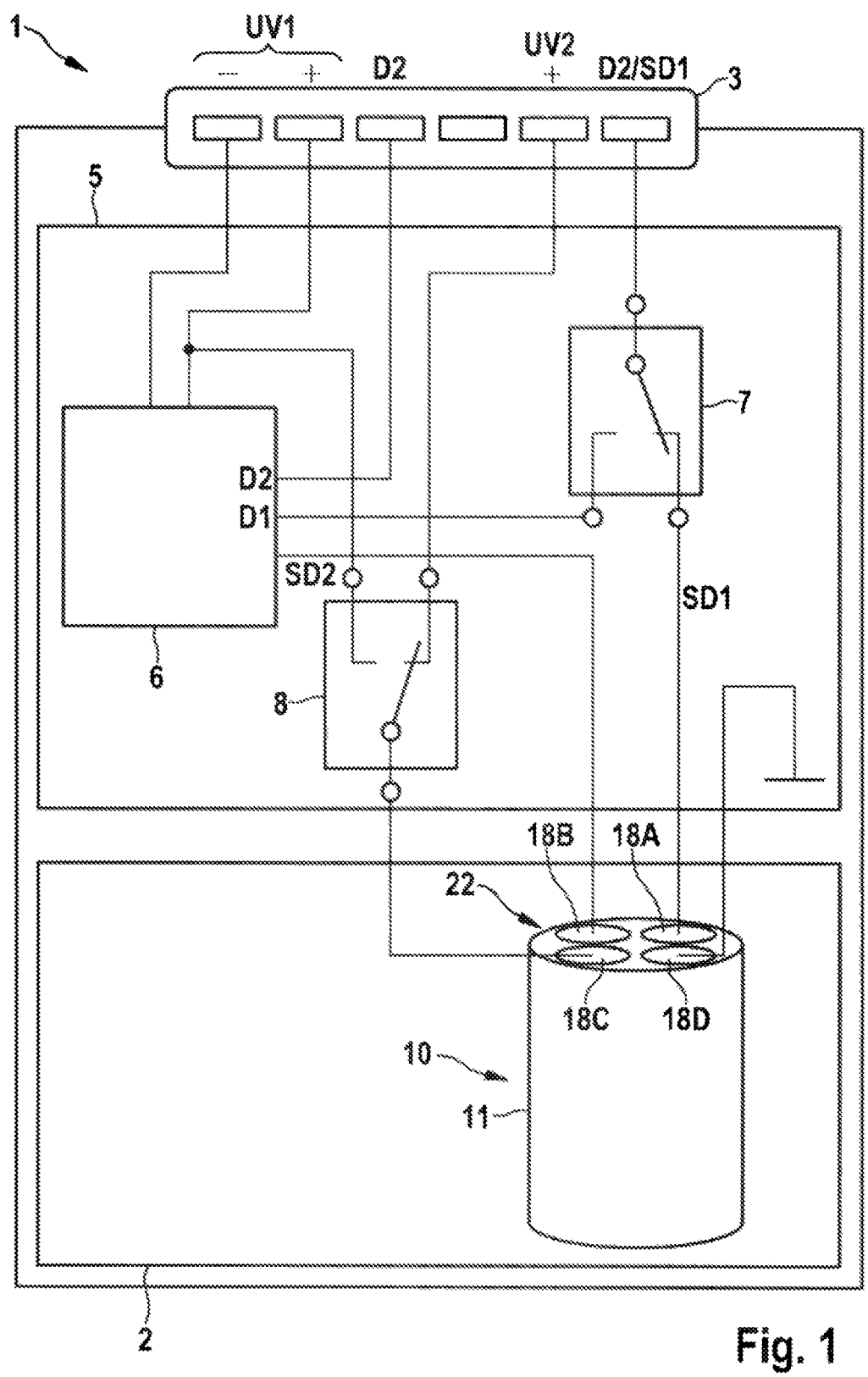
FIG. 1 shows a schematic block representation of an exemplary embodiment of a braking system according to the disclosure for a vehicle with an exemplary embodiment of a sensor arrangement according to the disclosure.

As can be seen from FIG. 1, the example shown of a brake system 1 for a vehicle according to the disclosure includes a connection interface 3, a hydraulic unit 2, a control unit 5, at least one sensor 10, which detects at least one physical variable in the hydraulic unit 2, and a sensor arrangement according to the disclosure.

Figure 2:
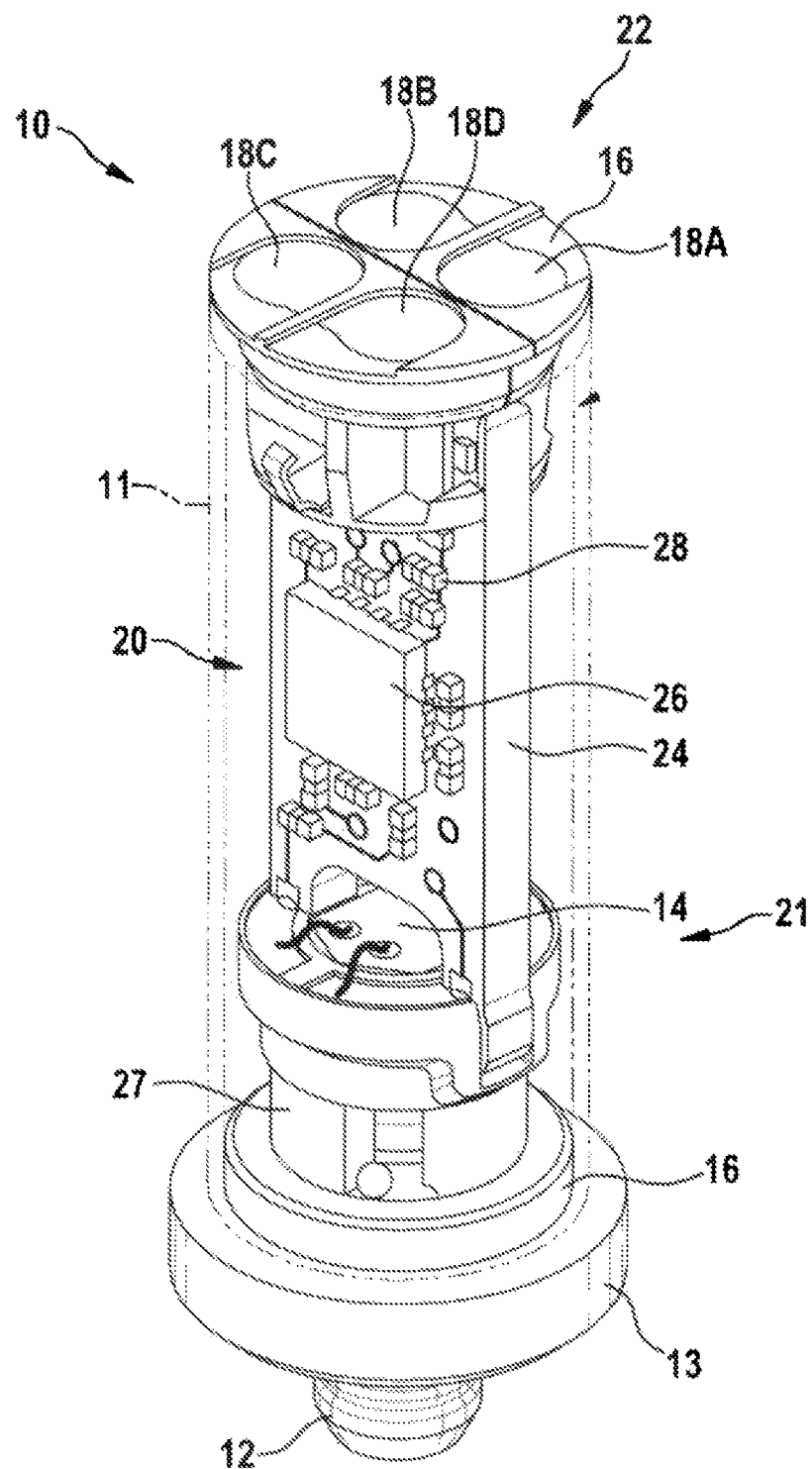
FIG. 2 shows a schematic perspective representation of an exemplary embodiment of a pressure sensor for the sensor arrangement according to the disclosure and the braking system according to the disclosure for a vehicle from FIG. 1.

As is also apparent from FIGS. 1 and 2, the sensor arrangement according to the disclosure for a braking system 1 of a vehicle in the illustrated exemplary embodiment comprises the connection interface 3 of the braking system 1, the control unit 5 and the at least one sensor 10. The at least one sensor comprises an external interface 22 with electrical contact points 18A, 18B, 18C, 18D, via which the at least one sensor 10 is connected to the control unit 5. The control unit 5 is connected to the connection interface 3 of the braking system 1 and can be supplied with power via the connection interface 3. In addition, the control unit 5 exchanges data D1, D2 with a higher-level unit of the vehicle via the connection interface 3. At least one electrical output signal SD1, SD2 of an electronic circuit 20 of at least one sensor 10 can be picked up and the at least one sensor 10 can be supplied with power via the electrical contact points 18A, 18B, 18C, 18D. Here, a first contact point 18A provides a first electrical output signal SD1 of the electronic circuit 20 and can be connected to the connection interface 3 via a first switching element 7. When the first switching element 7 is in the deenergized state shown, the first contact point 18A is to the connection interface 3 and is disconnected from the connection interface 3 when the first switching element 7 is in the energized state.

As can further be seen from FIG. 1, in the illustrated exemplary embodiment a second contact point 18B provides a second electrical output signal SD2 of the electronic circuit 20 of the sensor 10 and is directly connected to a computing unit 6 of the control unit 5. As can also be seen from FIG. 1, when the first switching element 7 is in the energized state the computing unit 6 of the control unit is connected to the connection interface 3 instead of to the first contact 18A and outputs corresponding first data D1 to the higher-level unit, which is not represented. In addition, the computing unit 6 of the control unit 5 outputs second data D2 via the connection interface 3 to the higher-level unit or receives second data D2 via the connection interface 3 from the higher-level unit. In the exemplary embodiment shown, the two electrical output signals SD1, SD2 are identical and include digital measurement data and digital state data, which are output according to a predetermined communication protocol to the computing unit 6 of the control unit 5 and/or to the connection interface 3. As a result, it is possible that both the higher-level unit and the computing unit 6 of the control unit 5 can receive output signals SD1, SD2 of the sensor 10 independently of each other via the first contact point 18A and via the second contact point 18B respectively.

With an alternative exemplary embodiment that is not shown of the sensor arrangement, only the first contact point 18A or only the second contact point 18B provides an electrical output signal SD1, SD2 of the electronic circuit 20 and may be connected via the first switching element 7 either to the computing unit 6 of the control unit 5 or to the connection interface 3. As a result, it is possible that the first contact point 18A can be switched in such a way that the first output signal SD1 can be "redirected" to the connection interface 3 of the braking system if necessary.

As can also be seen from FIG. 2, the illustrated exemplary embodiment of the sensor 10 includes a transparently represented protective sleeve 11, in which are arranged a measuring element 14, a circuit carrier 27, a circuit board 24 that carries the electronic circuit 20 with at least one electronic and/or electrical component 28 and at least one ASIC component 26 (ASIC: application-specific integrated circuit), and a contact unit 16. By means of the contact unit 16, at least one electrically conductive connection can be established between the electronic circuit 20 on the circuit board 40 and the electrical contact points 18A, 18B, 18C, 18D of the external interface 22 of the sensor 10, which are arranged on an outward-directed end face of a base body of the contacting unit 16. Here, the electronic circuit 20 generates the corresponding digital measurement data from the analog measurement variables detected by the measuring element 14. In addition, the electronic circuit 20 generates the state data from the analog measurement variables and/or from the digital measurement data.

As can further be seen from FIG. 2, in the illustrated exemplary embodiment the sensor 10 is implemented as a pressure sensor and the measuring element 14 as a pressure measuring cell, which in particular detects a hydraulic pressure of a solenoid valve-controlled fluid in the hydraulic unit 2. The circuit board 20 is arranged essentially perpendicular to the end face of the circuit carrier 27 and to the inner end face of the base body of the contacting unit 16 and is designed to be populated on both sides. The electronic circuit 20 performs signal amplification and/or processing of an analog raw signal of the measuring element 14. The measuring element 16 converts the hydraulic pressure into at least one analog measuring signal, which is picked up via an internal interface 21 of the circuit carrier 27 and applied to the electronic circuit 20. For this purpose, the measuring element 14 comprises multiple connection points that are not specified in more detail, via which the at least one analog measuring signal of the measuring element 14 is picked up and transferred to the electronic circuit 20 via corresponding contact points on the circuit carrier 27 and on the circuit board 24. As can further be seen from FIG. 2, the internal interface 21 is formed on a lower end of the protective sleeve 11, and the external interface 22 is formed on an upper end of the protective sleeve 11. The protective sleeve 11 protects the inner workings of the sensor 10 from excessive mechanical stress.

As can further be seen from FIG. 2, the protective sleeve 11 is implemented in the illustrated exemplary embodiment as a hollow cylinder and is joined at the lower end to a sensor carrier 13, which comprises a mounting flange that is not specified in more detail and a measuring connection 12, which is implemented as a self-clinching connection. The sensor 10 can be attached via the mounting flange to a fluid block that is not illustrated of the hydraulic unit 2.

As can further be seen from FIG. 1, the sensor 10 is supplied with power via a second switching element 8 either by a first power supply UV1, which also supplies the control unit with power, or by a second power supply UV2, which is independent of the first power supply UV1. Therefore, a third contact point 18C can be connected via the second switching element 8 to the first power supply UV1 of the control unit 5 or via the connection interface 3 to the second power supply UV2. In the deenergized state of the second switching element 8 shown, the third contact point 18A is connected via the connection interface 3 to the second power supply UV2. With the second switching element 8 in the energized state (not shown), the third contact point 18A is connected to the first power supply UV1. Due to this connection, the sensor 10 can be supplied with power from the second power supply UV2 independently of the control unit 5 and the output signals SD1, SD2 can be provided within a very short time. Furthermore, a fourth contact point 18D is directly connected to a ground connection of the control unit 5.

As can also be seen from FIG. 1, the first switching element 7 and the second switching element 8 are arranged within the control unit 5 in the illustrated exemplary embodiment.

What is claimed is:

1. A sensor arrangement for a braking system of a vehicle, the sensor arrangement comprising:
   a connection interface of the braking system;
   a control device connected to the connection interface of the braking system, the control device being supplied with power via the connection interface, the control device being configured to exchange data with a higher-level device via the connection interface; and
   at least one sensor including an external interface having electrical contact points, the at least one sensor being connected to the control device via the electrical contact points, at least one electrical output signal of an electronic circuit of the at least one sensor being provided via the electrical contact points, the at least one sensor being supplied with power via the electrical contact points,
   wherein a first contact point of the electrical contact points is configured to provide a first electrical output signal of at least one electrical output signal of the electronic circuit, the first contact point being connected to the connection interface via a first switching element, the first switching element being configured to (i) connect the first contact point to the connection interface when the first switching element is in a deenergized state and (ii) disconnect the first contact point from the connection interface when the first switching element is in an energized state, and
   wherein the first switching element is configured to connect the connection interface to a computing device of the control device when the first switching element is in the energized state.

2. The sensor arrangement according to claim 1, wherein a third contact point of the electrical contact points is configured to connect to one of (i) a first power supply of the control device via a second switching element and (ii) a second power supply via the connection interface.

3. The sensor arrangement according to claim 2, wherein the second switching element is configured to (i) connect the third contact point to the first power supply when the second switching element is in the energized state and (ii) connect the third contact point to the second power supply via the connection interface when the second switching element is in the deenergized state.

4. The sensor arrangement according to claim 2, wherein at least one of the first switching element and the second switching element are arranged within the control device.

5. The sensor arrangement according to claim 1, wherein the at least one electrical output signal corresponds to one of (i) at least one analog measurement variable and (ii) digital measurement data that the electronic circuit determines based on the at least one analog measurement variable.

6. The sensor arrangement according to claim 5, wherein the at least one electrical output signal corresponds to digital state data that the electronic circuit generates based on one of (i) the at least one analog measurement variable and (ii) the digital measurement data.

7. The sensor arrangement according to claim 1, wherein a second contact point of the electrical contact points is configured to provide a second electrical output signal of the at least one electrical output signal of the electronic circuit, the second contact point being directly connected to a computing device of the control device.

8. The sensor arrangement according to claim 1, wherein a fourth contact point of the electrical contact points is directly connected to a ground connection of the control device.

9. A braking system for a vehicle, the braking system comprising:
   a hydraulic unit;
   a connection interface;
   a control device connected to the connection interface of the braking system, the control device being supplied with power via the connection interface, the control device being configured to exchange data with a higher-level device via the connection interface; and
   at least one sensor configured to detect at least one physical variable in the hydraulic unit, the at least one sensor including an external interface having electrical contact points, the at least one sensor being connected to the control device via the electrical contact points, at least one electrical output signal of an electronic circuit of the at least one sensor being provided via the electrical contact points, the at least one sensor being supplied with power via the electrical contact points,
   wherein a first contact point of the electrical contact points is configured to provide a first electrical output signal of at least one electrical output signal of the electronic circuit, the first contact point being connected to the connection interface via a first switching element, the first switching element being configured to (i) connect the first contact point to the connection interface when the first switching element is in a deenergized state and (ii) disconnect the first contact point from the connection interface when the first switching element is in an energized state, and
   wherein the first switching element is configured to connect the connection interface to a computing device of the control device when the first switching element is in the energized state.

* * * * *